Figure 1:
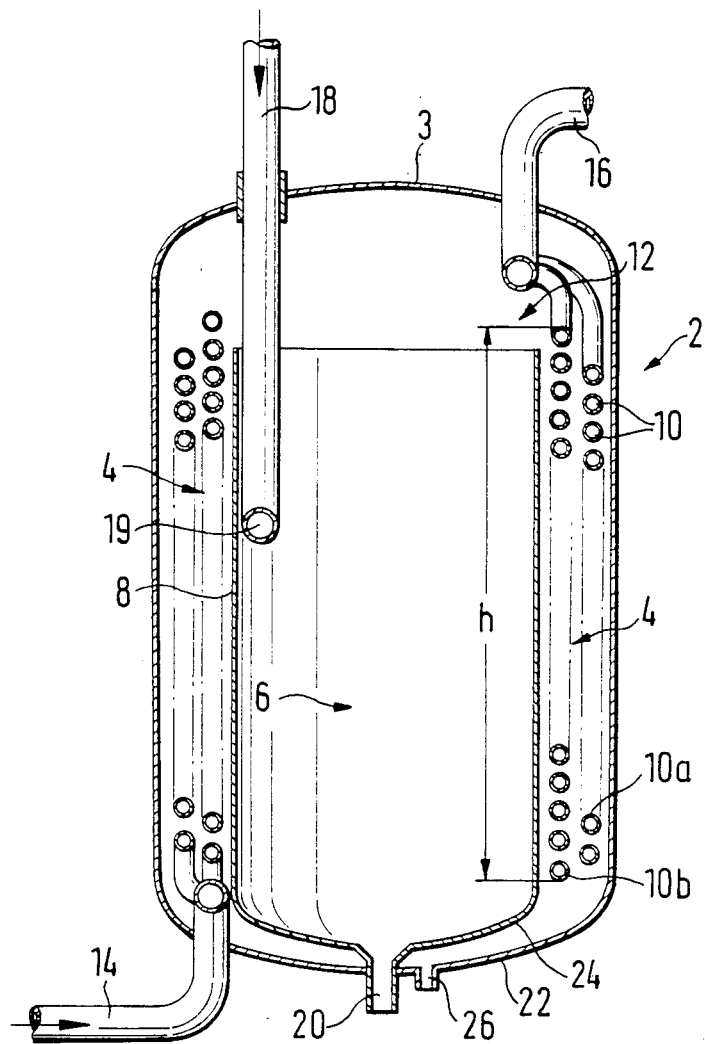

United States Patent [19]

Widhopf

[11] Patent Number: 4,681,066
[45] Date of Patent: Jul. 21, 1987

[54] BOILER FOR BOILING MASH OR WORT

[75] Inventor: Martin Widhopf, Freising-Pulling, Fed. Rep. of Germany

[73] Assignee: Anton Steinecker Maschinenfabrik GmbH, Freising, Fed. Rep. of Germany

[21] Appl. No.: 807,667

[22] Filed: Dec. 11, 1985

[30] Foreign Application Priority Data

Jan. 21, 1985 [DE] Fed. Rep. of Germany ....... 3501805

[51] Int. Cl.$^4$ .............................................. F22B 5/00
[52] U.S. Cl. ................................. 122/234; 122/13 R; 122/21; 122/249; 165/111; 165/160; 165/163
[58] Field of Search .............. 122/1 R, 1 B, 6 R, 7 R, 122/13 R, 33, 169, 234, 249, 27, 21, 483; 165/160, 163, 110, 111

[56] References Cited

U.S. PATENT DOCUMENTS

| 2,127,732 | 8/1938 | Heitman | 165/160 |
| 2,425,669 | 8/1947 | Brock | 165/111 |
| 3,482,625 | 12/1969 | Bray | 165/110 X |
| 4,257,479 | 3/1981 | Newton | 165/163 X |
| 4,522,257 | 6/1985 | Wolfseder | 165/111 |

FOREIGN PATENT DOCUMENTS 3303671 8/1984 Fed. Rep. of Germany.

Primary Examiner—Albert J. Makay
Assistant Examiner—Steven E. Warner
Attorney, Agent, or Firm—Finnegan, Henderson, Farabow, Garrett & Dunner

[57] ABSTRACT

The invention relates to a boiler for boiling a mash or wort, having an interior partition dividing the boiler into a heat exchanger section and a precipitation section. The boiler according to the invention is characterized in that the partition divides the boiler into an inner precipitation section and a surrounding heat exchanger section, i.e. in that the precipitation section and the heat exchanger section are disposed one within the other. This results in the particular advantage that the overall height of the boiler may be reduced. Since in addition the full height of the boiler is available for the accommodation of pipe conduits in the heat exchanger section, the flow resistance in the pipe conduits may be reduced. In summary, the boiler according to the invention is of simple construction to thereby facilitate the cleaning thereof.

4 Claims, 2 Drawing Figures

BOILER FOR BOILING MASH OR WORT

DESCRIPTION

The invention relates to a boiler for boiling a mash or wort, having an interior partition dividing the boiler into a heat exchanger section and a precipitation section, and including helical pipe conduits in said heat exchanger section.

From DE-OS No. 33 03 671 it is already known to provide a boiler employed for boiling a wort or mash with an interior partition dividing it into a heat exchanger section and a precipitation section. The wort to be heated flows through pipe conduits disposed in the heat exchanger section so as to be heated by the heat released by a medium flowing around the pipe conduits.

In installations for the continuous boiling of a wort, a plurality of such boilers are connected in series, so that the wort, after having been preheated in the heat exchanger section of a first boiler, leaves said first boiler through an outlet thereof and is supplied to a second boiler of identical construction to flow through the helical pipe conduits thereof, so as to be finally brought to the required temperature.

After the wort has thus been brought to the boil in the heat exchanger sections of the successive boilers, it is supplied to the likewise series-connected precipitation sections of the separate boilers, in which it expands to atmospheric pressure with the resultant lowering of its temperature. This expansion results in the release of vapors which in the case of such boilers comprising a combination of a heat exchanger and a precipitation section may be used as the heating medium in the heat exchange section.

The boiler known from DE-OS No. 33 03 671 is divided by said partition in such a manner that the heat exchanger section is disposed substantially in the upper half of the boiler, while the precipitation section is located in the lower half of the boiler.

The known boiler has a certain disadvantage in that its construction is of considerable height due to the fact that the precipitation section and the heat exchanger section are separate and disposed one above the other. In order to prevent the overall height of the boiler from becoming excessive, it is additionally required to arrange the pipe conduits in a plurality of helical windings so as to provide a sufficient heat exchanger surface area. This provision leads to a corresponding increase of the flow resistance in the pipe conduits.

It is therefore an object of the invention to provide a boiler combining a heat exchanger and a precipitation section in a single structural unit of a reduced overall height as compared to the known boiler.

In order to attain this object, the invention provides that the helical pipe conduits are disposed adjacent the outer periphery of the boiler interior to extend therearound substantially over the full height of the boiler, and that the partition extends in coaxial relationship inwards of the helical pipe conduits substantially over the full height thereof so as to divide the boiler interior into an inner precipitation section and a surrounding outer heat exchanger section.

In accordance with the invention, the partition is thus disposed in such a manner that the interior of the boiler is divided into an outer heat exchanger section and an inner precipitation section, i.e, that the precipitation section is formed by the space surrounded by the helical pipe conduits. The heat exchanger and precipitation sections are thus no longer disposed one above the other, as in the known construction, but one inside the other. As a result, the pipe conduits may extend substantially over the full height of the boiler, so as to obtain the requisite heat exchanger surface are even with a relatively reduced construction height of the boiler as compared to the known boiler. There is the further resultant advantage that a smaller number of pipe windings has to be provided per volume unit of the boiler. This again results in a reduced flow resistance for the wort flowing through the pipe conduits. As the pipe conduits do not have to be disposed in a compact arrangement, there is the further advantage that cleaning of the boiler interior is greatly facilitated even in the heat exchanger section.

In an advantageous embodiment, the invention provides that the boiler has the shape of an elongate upright cylinder closed by a cover and a bottom wall, and that the partition is a coaxial open-top inner cylinder surrounding the precipitation section. This provision results in a very simple construction of the boiler facilitating its manufacture. The open top of the inner cylinder results in the advantage that the vapors released in the precipitation section on expansion of the wort are capable of escaping upwards from the precipitation section through a large opening for entering the heat exchanger section.

According to another advantageous aspect of the invention, the inner cylinder is provided with a cambered bottom, with an outlet passage extending therefrom through the likewise cambered bottom of the boiler. The cambered bottom facilitates the flow of the wort from the precipitation section through the outlet passage. On the other hand, the cambered bottom of the boiler facilitates the complete discharge of the condensate from the heat exchanger section, so that the heat exchanger section will not be contaminated by condensate collecting at the bottom. As a result, frequent cleaning of the heat exchanger section and its bottom portion is not necessary.

In accordance with a further embodiment of the invention, a supply conduit for the medium to be precipitated leads into the precipitation section and is provided with an outlet opening in tangential alignment with the interior wall surface of the inner cylinder. As a result of this provision, the wort enters the precipitation section in a tangential direction of the inner cylinder and is thus capable of effectively expanding to thereby obtain an optimum vapor release effect.

In a preferred embodiment the invention provides that at the bottom and in the cover of the boiler, respectively, there are provided a supply conduit and a discharge conduit for the medium flowing through the pipe conduits. Even if there is a plurality of pipe conduits employed, all of such pipe conduits are connected in common to the supply and discharge conduits.

Preferably the heat exchanger section contains two pipe conduits disposed in coaxial relationship to one another. Since substantially the full height of the boiler is available for accommodating the helical pipe conduits, two such pipe conduits will be sufficient for providing the requisite heat exchanger surface area.

Figure 2:
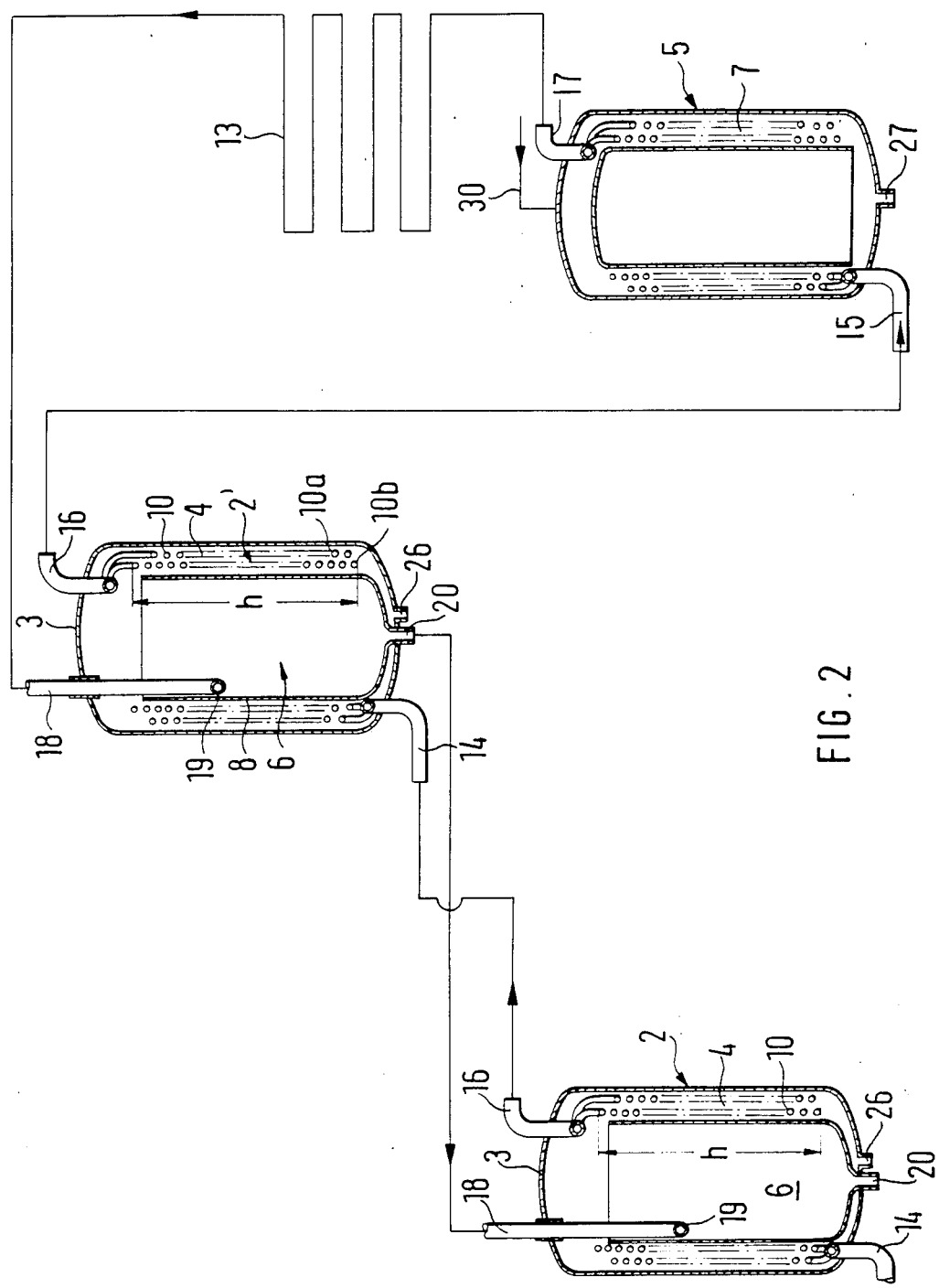

A preferred embodiment of the invention shall now be described in detail by way of example with reference to the accompanying drawings, wherein:

FIG. 1 shows a diagrammatical longitudinal sectional view of a boiler according to the invention, and FIG. 2 shows a number of boilers according to the invention connected to one another to form an installation for boiling a mash or wort.

Generally indicated at 2 in Fig. 1 is a boiler according to the invention to be employed for boiling a mash or wort. Boiler 2 has the shape of an elongated cylindrical body closed at respective ends by a top cover 3 and a bottom 22. The interior 12 of boiler 2 is divided into a heat exchanger section 4 and a precipitation section 6 by an inner cylinder 8 extending coaxial with the outer boiler wall so as to form a partition between the heat exchanger section 4 and the precipitation section 6. Adjacent cover 3 of boiler 2 inner cylinder 8 has an open top, while at its lower end it is closed by a cambered bottom 24, so that the only communication between precipitation section 6 and heat exchanger section 4 is via the open top of inner cylinder 8.

Disposed in heat exchanger section 4 is a pipe conduit assembly 10 consisting of an inner helical pipe conduit 10B and an outer helical pipe conduit 10A, both of which extend concentrically about inner cylinder 8.

Extending through bottom 22 of boiler 2 is a supply means comprising a conduit 14 for supplying the wort to be heated in heat exchanger section 4 to pipe conduit assembly 10. At the top of boiler 2, a discharge means comprising a conduit 16 extends through cover 3 for discharging the wort heated in the pipe conduit assembly. Also extending through cover 3 of boiler 2 is a supply means comprising a conduit 18 having an outlet opening 19 located within the precipitation section 6 surrounded by inner cylinder 8 in tangential alignment with respect to the interior wall surface, that is, perpendicular to the plane of the drawing. The wort entering through supply conduit 18 expands after exiting from outlet opening 19.

The expanded or relaxed wort may then be withdrawn through an outlet means comprising a passage 20 provided in cambered bottom 24.

As shown in the drawings, pipe conduits 10 extend substantially over the full height of boiler 2, while inner cylinder 8 extends over the full height h of pipe conduits 10. In this manner, substantially the full height of boiler 2 is available for heat exchanger section 4, so that a sufficient heat exchanger efficiency is obtainable even in a boiler 2 of relatively reduced height. The individual pipe coils extend not very closely to one another, so that the heat exchange medium can flow therearound on all sides, the heat exchange medium being formed by the vapors released by the expansion of the wort in precipitation section 6.

The condensate forming in heat exchanger section 4 is discharged through an outlet opening 26 formed in cambered bottom 22 of boiler 2.

It is thus seen that the boiler according to the invention is of extremely simple construction, resulting in low manufacturing cost. The simple construction likewise facilitates cleaning of the boiler interior.

Shown in FIG. 2 is the manner in which the boiler according to the invention can be employed for forming an installation for continuously boiling a mash or wort by heating it in successive steps. The boilers 2 and 2' shown in this figure are of the same construction as the boiler 2 shown in FIG. 1. The third boiler 5 shown differs from boilers 2 and 2' in that its inner section does not serve for precipitating or expanding the wort, there being provided only a heat exchanger section 4, as will be explained in detail.

As shown in FIG. 2, the heat exchangers of boilers 2 and 2' are connected in series, i.e. the discharge conduit 16 of boiler 2 is connected to supply conduit 14 of boiler 2'. The wort supplied through supply conduit 14 of first boiler 2 is thus further heated in heat exchanger 4 of second boiler 2'. Discharge conduit 16 of second boiler 2' is connected to supply conduit 15 of a per se already known heat exchanger 5, so that the wort supplied to the system is heated to its boiling temperature of for instance 140° C. as it flows through the pipe conduits 7 of heat exchanger 5. The heating of the wort in third heat exchanger 5 is accomplished by means of superheated steam supplied to heat exchanger 5 through a steam supply conduit 30. The condensate collects at the bottom of the heat exchanger and is discharged through outlet opening 27.

After having been heated to its boiling temperature, the wort leaves heat exchanger 5 through discharge conduit 17 and flows through a hold section 13, wherein its pressure and temperature are maintained with the aid of a pressure holding valve (not shown). It is in this hold section that the isomerization and coagulation of the proteins take place.

The wort subsequently flows through supply conduit 18 of second boiler 2' into precipitation section 6 of this boiler to expand therein, accompanied by a lowering of its temperature to 120° C. for instance. This expansion or relaxation results in the release of vapors which leave precipitation section 6 in an upward direction to subsequently act as the heating medium in heat exchanger section 4 of second boiler 2'.

The wort collects in the lower portion of precipitation section 6 and exits therefrom through discharge opening 20 for flowing through supply conduit 18 of first boiler 2 into precipitation section 6 of this boiler to expand therein to atmospheric pressure, accompanied by a lowering of its temperature to about 100° C. The vapors released by this expansion likewise rise in precipitation section 6 and enter heat exchanger section 4 to act as the heating medium of first boiler 2. The wort may then be withdrawn through discharge opening 20 of boiler 2 for further processing.

The condensate collecting in any of the heat exchangers is discharged through the outlet openings 26, 27 of the respective boilers.

I claim:

1. A boiler for boiling mash or wort comprising an elongated upright cylindrical boiler body closed at the top and bottom, an internal cylindrical partition open at the top and extending around the interior of and spaced from the periphery of the boiler body dividing said body into an inner precipitation section and a surrounding outer heat exchange section, helical pipe conduit circling around the outer periphery of the internal partition in the heat exchange section of the boiler and extending over substantially the full height of the boiler with said partition being in coaxial relationship with said helical pipe conduit and the boiler body and extending over substantially the full height of said helical conduit, a supply conduit in the bottom of the boiler for supplying mash or wort to be heated to said helical conduit and a discharge conduit in the top of the boiler for discharging heated mash or wort from said helical conduit and means for supplying heated mash or wort to and for withdrawing precipitated mash or wort from said precipitation section of said boiler.

2. The boiler of claim 1 in which said heat exchange section contains two helical pipe conduits disposed in coaxial relationship to one another.

3. The boiler of claim 1, wherein said open-topped cylindrical partition has a cambered bottom and the means for withdrawing precipitated mash or wort from the boiler comprises an outlet that extends from the bottom of the partition through the bottom of the boiler.

4. The boiler of claim 1 or 2, wherein the means for supplying heated mash or wort to the precipitation section comprises a supply conduit extending into the interior of the cylindrical partition and having an outlet opening in tangential alignment with the interior wall surface of the partition.

* * * * *